United States Patent [19]
Barlas et al.

[11] Patent Number: 5,211,072
[45] Date of Patent: May 18, 1993

[54] VARIABLE RATIO PARK BRAKE WITH SLACK ADJUST

[75] Inventors: Serge A. Barlas, Westland; Paul D. Nordstrom, Redford, both of Mich.

[73] Assignee: Dura Mechanical Components, Inc., Troy, Mich.

[21] Appl. No.: 557,751

[22] Filed: Jul. 26, 1990

[51] Int. Cl.⁵ .............................................. G05G 1/04
[52] U.S. Cl. ........................................ 74/512; 74/516; 74/535; 74/540
[58] Field of Search ............... 74/512, 535, 536, 539, 74/533, 516, 540, 541

[56] References Cited
U.S. PATENT DOCUMENTS

| | | | |
|---|---|---|---|
| 3,109,320 | 11/1963 | Krautwurst | 74/541 |
| 3,236,121 | 2/1966 | Gdowik et al. | 74/512 X |
| 3,443,450 | 5/1969 | Fender | 74/539 |
| 3,487,716 | 1/1970 | Hirst, Jr. | 74/516 |
| 3,623,380 | 11/1971 | Tomczak | 74/512 |
| 3,625,087 | 12/1971 | Flory et al. | 74/512 X |
| 3,875,820 | 4/1975 | Morden | 74/512 |
| 3,918,321 | 11/1975 | Hybarger | 74/516 |
| 3,929,033 | 12/1975 | Mark | 74/512 |
| 3,938,407 | 2/1976 | Nisbet | 74/516 |
| 4,391,159 | 7/1983 | Sellmeyer | 74/516 |
| 4,612,823 | 9/1986 | De Leeuw et al. | 74/533 |
| 4,841,798 | 6/1989 | Porter et al. | 74/512 |

Primary Examiner—David A. Scherbel
Assistant Examiner—Winnie Yip
Attorney, Agent, or Firm—David A. Greenlee

[57] ABSTRACT

A brake operator for a vehicle having a cable-operated park brake mechanism comprises a pedal lever pivotally mounted on a mounting bracket for movement between a brake-released position and a range of brake-applied positions, and a lever latch for selectively releasably latching the lever in any selected brake-applied position. The cable is attached to the lever by a reel having a circular cable-engaging surface, the reel being pivotally mounted on the lever eccentrically of the lever pivot and being pivotable to wrap the cable onto the circular surface to move the cable relative to the lever to remove slack. The eccentric mounting provides a predetermined ratio of cable travel per unit of lever movement. The cable tangentially engages the reel surface at the same location on the lever in all positions of the reel to provide the same predetermined variable ratio in all positions of the reel. Slack take-up is provided by a sector gear carried by the reel, a spring biasing the reel in slack take-up direction, and a pawl carried by the lever and engageable with the sector gear teeth to latch the reel in a fixed position during lever movement to brake-applied position.

3 Claims, 4 Drawing Sheets

VARIABLE RATIO PARK BRAKE WITH SLACK ADJUST

FIELD OF THE INVENTION

This invention relates generally to vehicle park brake actuators and, more particularly, to a variable ratio park brake actuator for a cable-operated brake mechanism.

BACKGROUND OF THE INVENTION

Motor vehicles are provided with a park brake that is usually operated by a cable. This cable is connected to a park brake actuator located inside the passenger compartment convenient to the driver. Many of these actuators incorporate a pedal lever for foot operation, while others utilize a hand lever to tension the cable to apply the park brake.

A pawl-and-ratchet or other type of latch mechanism is provided to retain the lever in a selected brake-apply position. Brake release is usually via operation of a release handle to disengage the pawl from the ratchet. A park brake actuator of this type is shown in De Leeuw et al. U.S. Pat. No. 4,612,823 and assigned to the assignee hereof.

Initial operation of the park brake actuator operating lever is at a relatively low input force as cable slack is taken up and the cable is initially tensioned. Further cable tensioning requires an increasing input force. Because the space provided for lever travel is limited, it is desirable to limit the lever travel required to fully set the park brake. It is also desirable to limit the maximum operator input force required to apply the park brake.

To accomplish this, variable ratio arrangements have been proposed. In these, the amount of cable travel per unit of lever travel decreases as the brake is applied. A park brake incorporating such a variable ratio arrangement is illustrated in Hybarger U.S. Pat. No. 3,918,321.

It has also been found that the brake-apply cable stretches with use. To accommodate this stretching, various slack take-up devices have been developed, such as the under-car compensator illustrated in Senft et al. U.S. Pat. No. 4,899,007. Another type of slack take-up device, mounted with the park brake actuator is disclosed in Porter et al. U.S. Pat. No. 4,841,798.

It would be desirable to provide a simplified park brake actuator which provides both the variable ratio and slack take-up features.

SUMMARY OF THE INVENTION

It is an object of this invention to provide a park brake actuator which incorporates a predetermined variable ratio mechanism and a slack take-up device. It is a further object of this invention to provide such a park brake actuator in which the same predetermined variable ratio is provided regardless of the amount of slack taken up.

In accordance with this invention, an operator for a vehicle having a cable-operated brake mechanism comprises a lever mounted on the vehicle for movement between a brake-released position and a range of brake-applied positions, latch means for selectively releasably latching the lever in any selected brake-applied position, variable ratio cable attachment means mounting the cable for movement by the lever so that lever movement effects a predetermined variable ratio of cable travel per unit of lever movement as the lever is moved to a brake-applied position, and slack take-up means mounting the cable attachment means for movement to remove cable slack.

In a preferred embodiment, this invention provides an operator for a vehicle having a cable-operated brake mechanism which comprises a pedal lever pivotally mounted on a mounting bracket for movement between a brake-released position and a range of brake applied positions, and a lever latch for selectively releasably latching the lever in any selected brake-applied position. The cable is attached to the lever by a take-up reel having a circular cable-engaging surface, the reel being pivotally mounted on the lever eccentrically of the lever pivot and being pivotable to wrap the cable onto the circular surface to move the cable relative to the lever to remove slack.

The eccentric mounting provides a predetermined decreasing ratio of cable travel per unit of lever movement. The cable tangentially engages the reel surface at the same location on the lever in all positions of the reel to provide the same predetermined variable ratio in all positions of the reel. Slack take-up is provided by a sector gear carried by the reel, a spring biasing the reel in slack take-up direction, and a pawl carried by the lever and releasably engageable with the sector gear teeth to latch the reel in a fixed position during lever movement to brake-applied position.

These and other objects and features of this invention will become more readily apparent upon reference to the annexed drawings, in which:

DETAILED DESCRIPTION OF THE INVENTION

Figure 1:
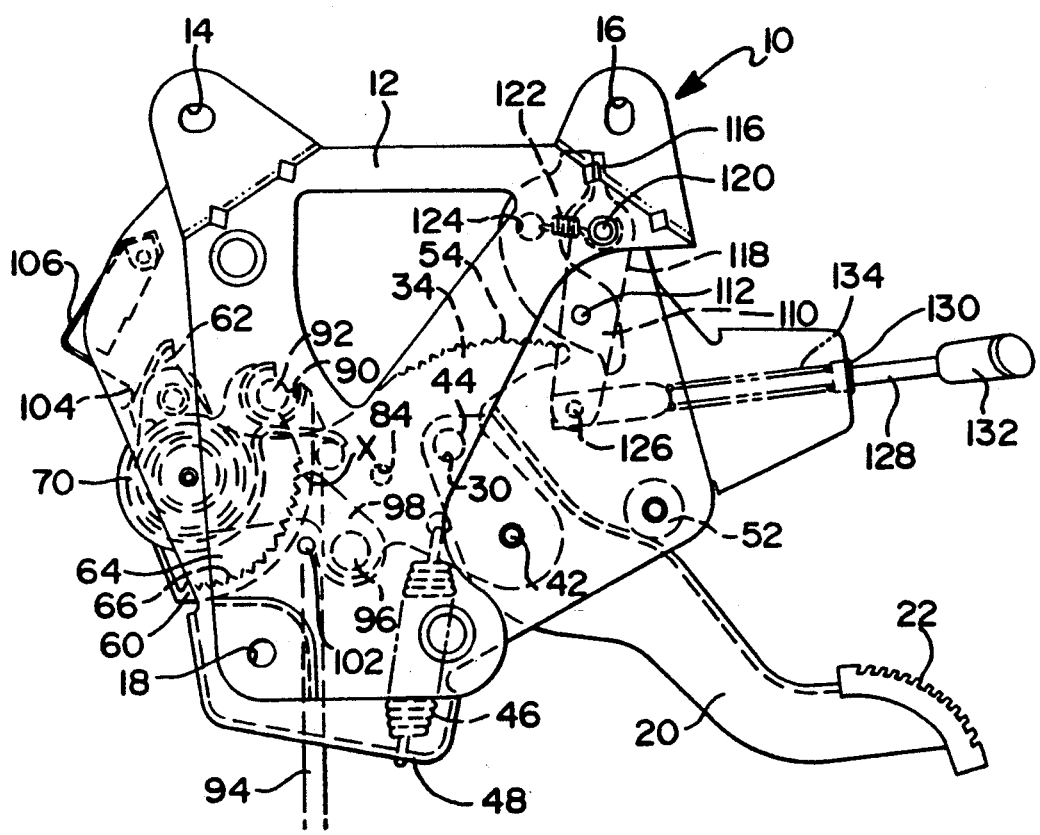
FIG. 1 is a side elevation of a park brake actuator for a cable-operated park brake, according to this invention, shown in brake-released position.
Figure 2:
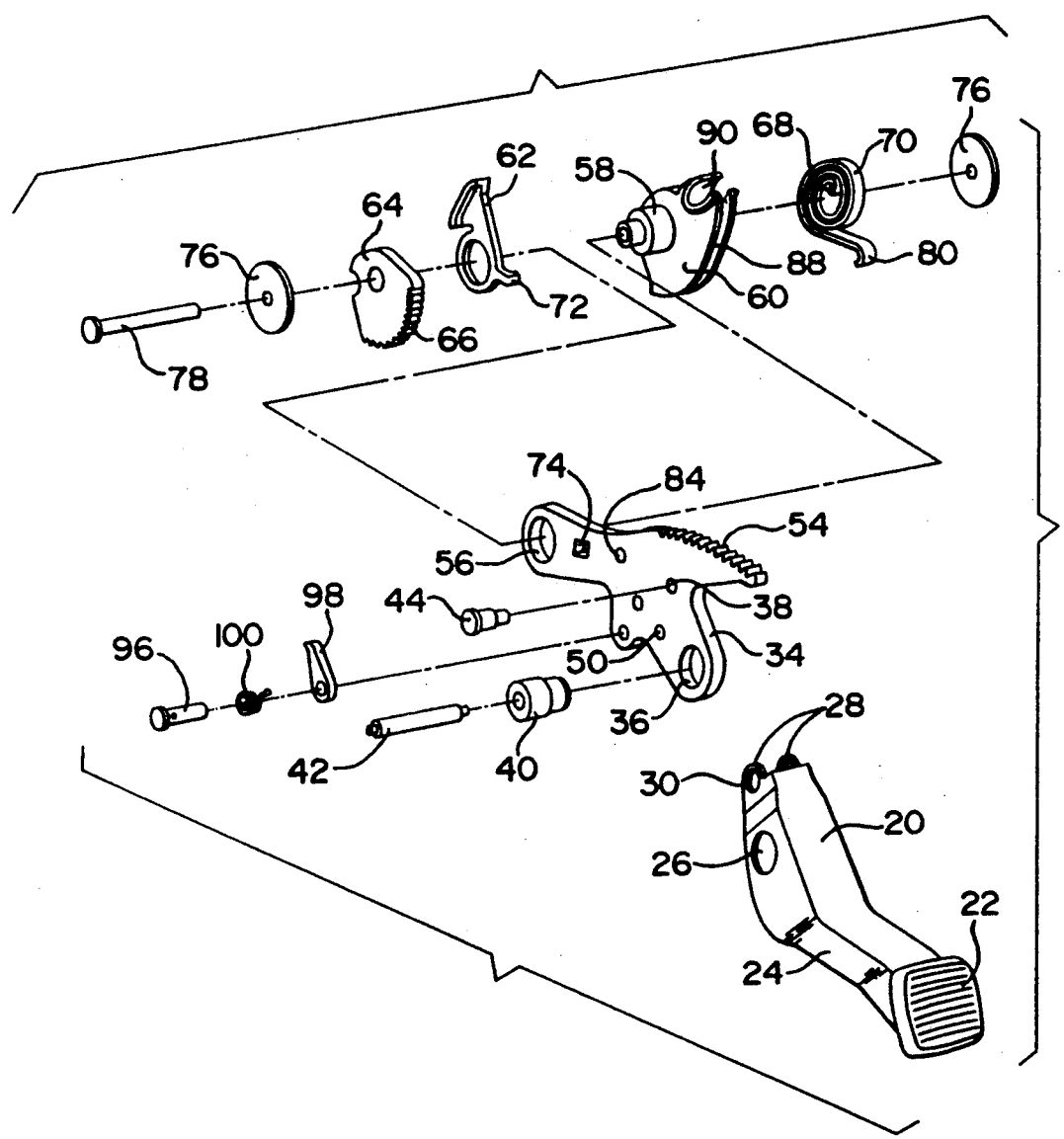
FIG. 2 is an exploded perspective view of the operating parts of the park brake actuator of FIG. 1.

Referring now to FIGS. 1 and 2 of the drawings, a park brake actuator according to this invention, generally designated 10, includes a stamped steel mounting bracket 12. Mounting holes 16, 18 and 20 are provided to enable the bracket to be conventionally mounted via bolts or screws (not shown) to support structure adjacent the driver's position in a motor vehicle.

A pedal 20 mounts a rubber pad 22 at one end for engagement by a driver's foot to operate the brake actuator, as will be later described. Pedal 20 has an inverted U-shape with spaced flanges 24, only one of which is shown. The flanges 24 include aligned holes 26 and terminate at its other end in spaced ears 28 having aligned holes 30.

Pedal flanges 24 embrace one end of a sector gear 34 so that aligned holes 26 and 30 respectively align with holes 36 and 38 formed in sector gear 34. Aligned holes 26, 36 receive a bushing 40 that is mounted via a pivot pin 42 to mounting bracket 12. A rivet 44 projects through aligned holes 28, 38 to secure sector 34 to pedal 20 for pivotal movement therewith about pivot pin 42.

A spring 46 attaches between a flange 48 on bracket 12 and a hole 50 in sector gear 34 to bias the pedal 20 against a bracket-mounted stop 52.

Sector gear 34 incorporates a plurality of gear teeth 54 along its upper surface and an enlarged aperture 56 at its other end. A hub 58 of a take-up reel 60 extends through aperture 56 and mounts a switch actuator on the other side of sector 34. Hub 58 includes a reduced spindle 62 that mounts a lock sector gear 64 having teeth 66. The other side of take-up reel 60 includes another hub (not shown) that mounts the inner end 68 of a take-up spring 70.

Switch actuator 62 includes a locking tang 72 that engages a mating aperture 74 in sector 34. This assembly is held together between a pair of washers and a rivet 78. Thus, take-up reel 60, sector 64 and spring 70 can rotate relative to sector 34 and switch actuator 62 which is prevented from rotating by tang 72. The hooked outer end 80 of spring 70 loops around a pin 82 carried by hole 84 in sector 34.

Take-up reel 60 is mounted eccentrically of pedal pivot 42 and incorporates a part-circular cable groove 88 that enters into a saddle slot 90 for receiving a fitting 92 on one end of a park brake operating cable 94. The other end of cable 94 is attached to any conventional park brake, which forms no part of this invention, which is actuated by tensioning of cable 94. Spring 70, which is mounted to apply a counterclockwise (as viewed in the drawings) force on take-up reel 60 to maintain tension on cable 94, and reel 60 together form the means for taking up cable slack. A shouldered rivet 96 mounts a drive pawl 98 for rotation on sector 34. Cable 94 tangentially engages reel groove 88 at a point designated X in FIG. 1. Thus cable 94 attaches to pedal 20 by means of its attachment to take-up reel 60 which is mounted eccentrically of pedal pivot 42.

A spring 100 engages between rivet 96 and pawl 98 to bias the pawl into engagement with take-up sector teeth 66 to form a slack latch. In the brake-released position of FIG. 1, pawl 98 is held out of engagement with teeth 66 by a post 102 mounted on mounting bracket 12. Thus, post 102 is the means for releasing the slack latch comprising pawl 98 and teeth 68. In this position, switch actuator 62 engages the blade 104 of a conventional brake light switch 106.

Figure 3:
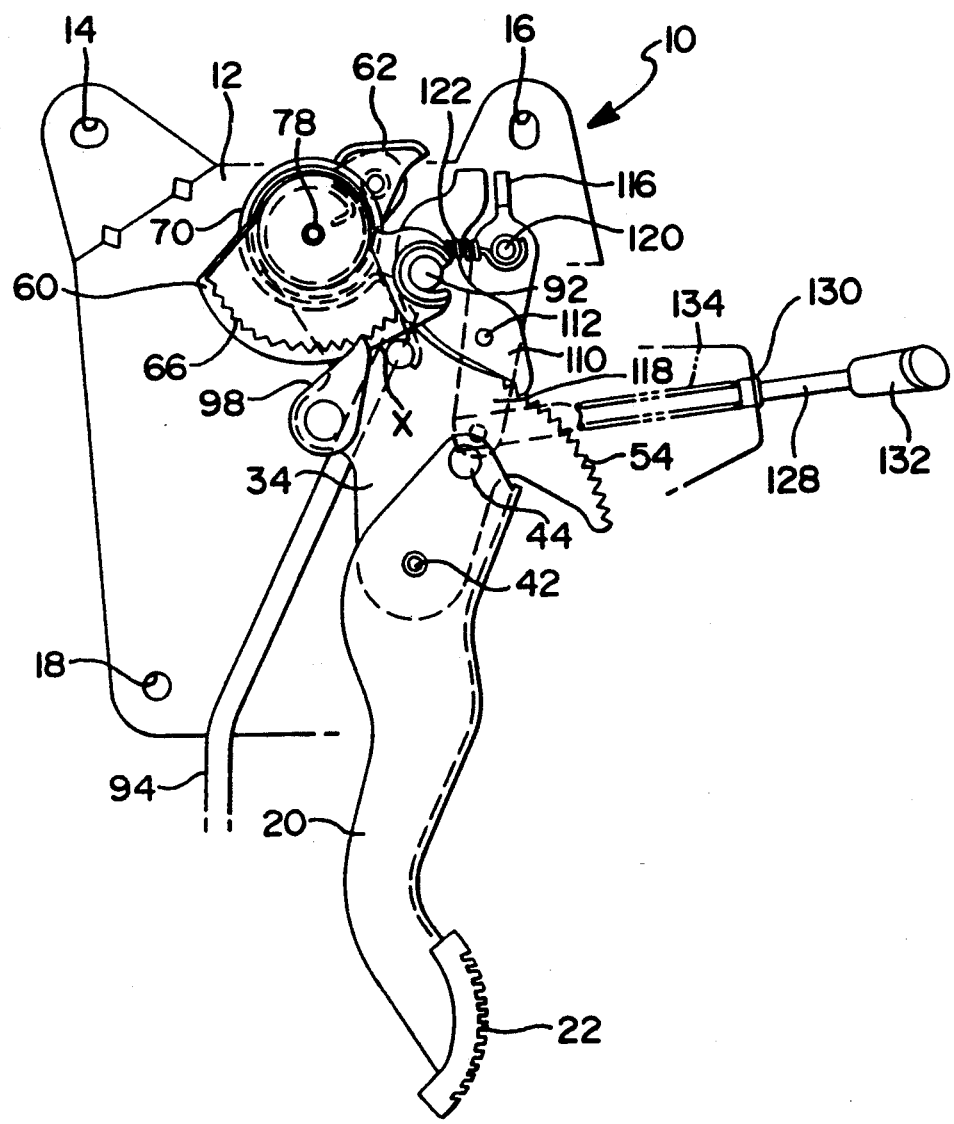
FIG. 3 is a view similar to FIG. 1, partially broken away to better illustrate operation of the parts, with the park brake actuator shown in a brake-applied position.

Referring now to FIGS. 1 and 3, a locking pawl 110 is pivoted by a rivet 112 to mounting bracket 12 and is biased by a spring 114 clockwise (as viewed in the drawings) into contact with sector teeth 54 when the sector is moved to the FIG. 3 position, as will be later described. The other end of pawl 110 is engageable by a flange 116 of an unlocking lever 118 that is pivoted to the mounting bracket by a rivet 120. A spring 122 extends from the back of lever 118 to engagement with a hole 124 in pawl 110 to bias the pawl into engagement with flange 116.

The other end of unlocking lever 118 is pivoted at 126 to the inner end of a rod 128 that extends through a hole 130 in bracket 12 and mounts a manual handle 132. Rod 128 is biased inwardly by a compression spring 134 so that spring 122 pulls pawl 110 clockwise (as viewed in the drawings) sufficiently to assure that the other end of pawl 110 interferes With movement of ratchet 34.

Operation of the park brake actuator 10 will now be described. When it is desired to apply the park brake, pedal 20 is depressed from the FIG. 1 position toward the FIG. 3 position. Initial movement of pedal 20 rotates sector 34 and lifts locking pawl 98 off post 102, enabling spring 100 to drivingly engage pawl 98 With the teeth 66 of sector 64. This fixes cable 94 to sector 34 for movement upon subsequent depression of pedal 20 to the FIG. 3 position.

As sector 34 rotates with pedal 20, teeth 54 will ratchet over pawl 110. Spring 122 assures that contact is maintained between pawl 110 and teeth 54. When pedal 20 is released, teeth 54 will wedge against pawl 110. Pawl 110 and teeth 54 form the means latching pedal 20 and, thus, the park brake actuator 10 in a selected position to apply the park brake. The park brake actuator is now in the position illustrated in FIG. 3.

As pedal 20 is depressed to rotate sector 34, cable 94 gradually unwraps from reel 60 as it rotates about pedal pivot 42. This action causes the ratio of incremental tensioning movement of cable 94 per unit of pedal movement to continuously vary as pedal 20 is moved. This ratio decreases to provide an increasing mechanical advantage, reducing the maximum force required to apply the park brake.

To release the park brake, handle 132 is grasped and pulled outwardly against the force of spring 134. This rotates lever 118, causing flange 116 to move pawl 110 out of engagement with teeth 54. This frees sector 34 and pedal 20 for movement back to the FIG. 1 brake-released position under the force of spring 46 until pedal 20 engages bumper stop 52. As the FIG. 1 position is approached, pawl 98 engages post 102, which forces the pawl out of engagement with lock sector teeth 66.

As time passes, continued usage of the park brake will stretch cable 94, creating slack. Spring 70 rotates reel 60 counterclockwise to automatically take up such slack and keep tension on cable 94. Subsequent actuation of the park brake will cause locking pawl 98 to engage the appropriate teeth 66 on locking sector 64 to lock in the slack adjustment for each park brake application.

Figure 4:
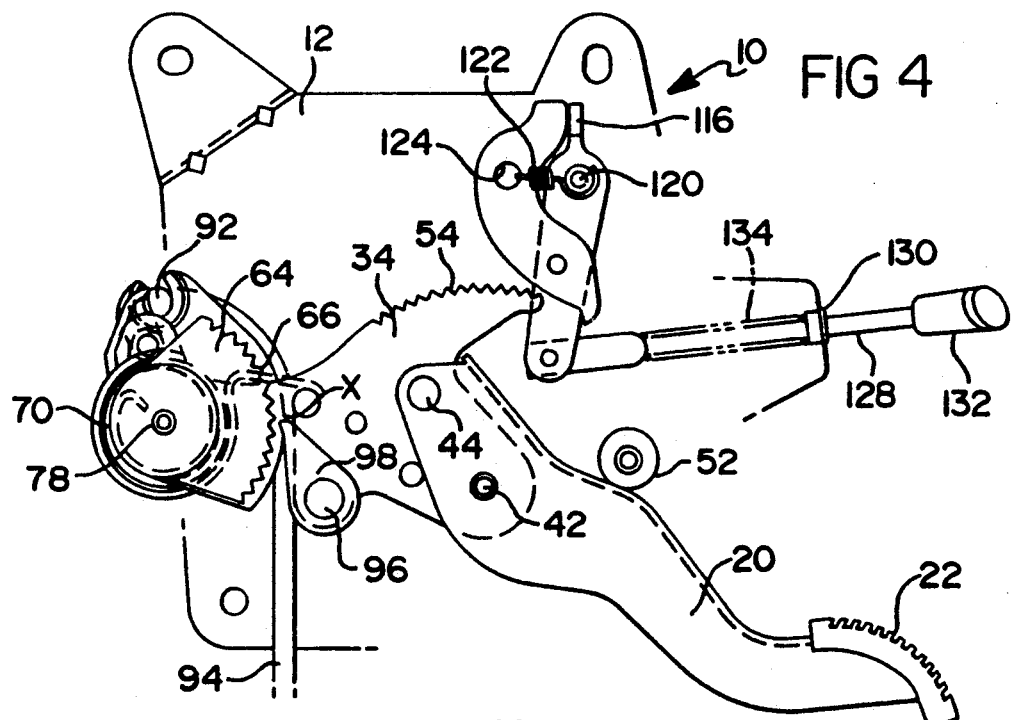
FIG. 4 is a view similar to FIG. 3, with the park brake actuator shown in brake-released position and illustrating slack adjustment of the cable.
Figure 5:
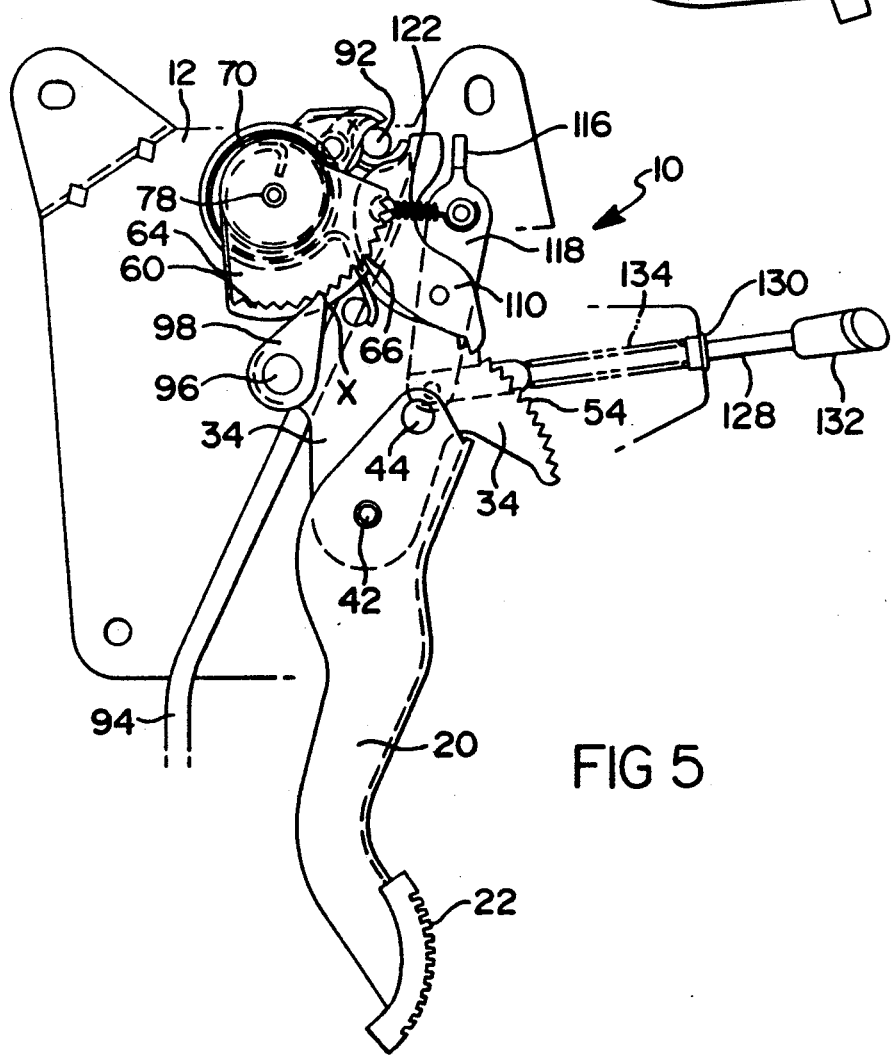
FIG. 5 is a view similar to FIG. 4, with the park brake actuator shown in brake-applied position.

Operation of the slack adjustment is illustrated in FIG. 4, which again depicts the park brake actuator in brake-released position, but after substantial cable stretch has occurred. Of particular note is the tangential engagement of cable 94 with reel groove 88 which again occurs at the same point X on sector 34 as in FIG. 1. Depressing pedal 20 to apply the park brake moves the actuator from the FIG. 4 position to that depicted in FIG. 5. Again, cable 94 engages reel groove 88 at X.

This arrangement assures that, upon actuation of the park brake actuator 10, the variable ratio of incremental tensioning movement of cable 94 per unit of pedal movement during park brake application is always the same. It is independent of the position of the slack take-up reel.

Of course, the exact ratio and the variability of that ratio can be altered by changing the geometry of the parts. In this matter, a park brake actuator according to this invention can be tailored for each specific application.

We claim:

1. A brake operator for a vehicle having a cable-operated brake mechanism comprising
   a mounting bracket on the vehicle,
   a lever pivotally mounted on the mounting bracket for movement between a brake-released position and a range of brake applied positions,
   lever latch means for selectively releasably latching the lever in any selected brake-applied position, and
   variable ratio cable attachment means attaching the cable to the lever so that lever movement effects a predetermined variable ratio of cable travel per unit of lever movement as the lever is moved to a brake-applied position, characterized by the cable attachment means being a take-up reel having a circular cable-engaging surface, the reel being pivotally mounted on the lever eccentrically of the lever pivot and being pivotable to wrap the cable onto the circular surface to move the cable relative to the level to remove slack, such that the cable tangentially engages the reel surface at the same location on the lever in all positions of the reel to provide the same predetermined variable ratio of cable travel per unit of lever movement in all positions of the reel, and by slack take-up means movably mounting the cable attachment means on the lever for movement to automatically remove cable slack, while maintaining the same predetermined variable ratio of cable travel per unit of lever movement in all positions of the cable attachment means upon movement of the lever from brake-released position to brake-applied position.

2. The brake operator of claim 1, further characterized by the slack take-up means including a sector gear carried by the reel, a spring biasing the reel in a slack take-up direction, a pawl carried by the lever and engageable with the sector gear teeth to latch the reel in a fixed position during lever movement to brake-applied position.

3. The brake operator of claim 2, further characterized by the slack take-up means including a latch release member mounted on the mounting bracket for disengaging the pawl from the sector teeth upon movement of the lever to brake released position.

* * * * *